Aug. 7, 1928.

J. F. DUBY 1,679,934

GEOMETRIC INSTRUMENT

Filed Oct. 6, 1925   2 Sheets-Sheet 1

Inventor:
John F. Duby,
by Emery, Booth, Janney & Varney.
Attys.

Aug. 7, 1928.
J. F. DUBY
1,679,934
GEOMETRIC INSTRUMENT
Filed Oct. 6, 1925  2 Sheets-Sheet 2
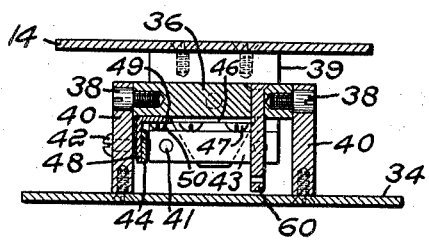
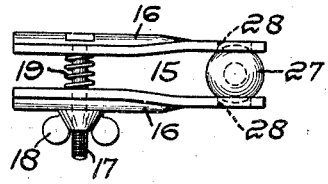
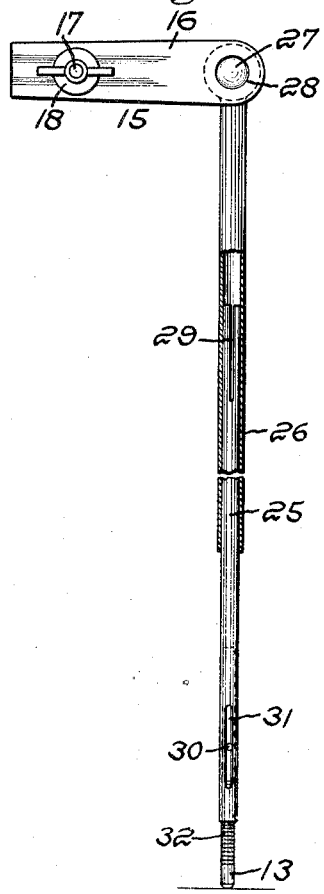
Inventor:
John F. Duby, Patented Aug. 7, 1928.

1,679,934

UNITED STATES PATENT OFFICE.

JOHN F. DUBY, OF DORCHESTER, MASSACHUSETTS.

GEOMETRIC INSTRUMENT.

Application filed October 6, 1925. Serial No. 60,803.

This invention relates to geometric instruments, and is more especially concerned with a novel method of and means for measuring the inclination of the axis of the king-pin of the steering gear of a land vehicle, such as a motor vehicle.

The invention will be best understood by reference to the following description, when taken in connection with the accompanying drawings of one specific embodiment thereof, and by means of which the method may be carried out, while its scope will be more particularly pointed out in the appended claims.

In the drawings:

Fig. 5 is a sectional view on line 5—5 of Fig. 4;

Fig. 6 is a plan of a pointer, or stylus, and a clamp by means of which the same may be secured to the stub axle, or wheel spindle of the steering knuckle; and Fig. 7 is an elevation, partly in vertical section, of the parts shown in Fig. 6.

Figure 1:
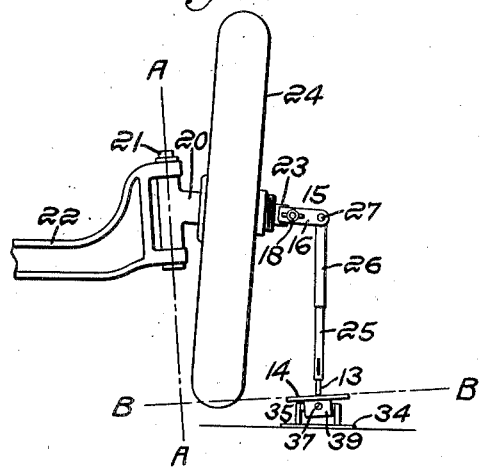
Fig. 1 is an elevation of a geometric instrument exemplifying the invention shown in connection with a portion of the steering gear of a motor vehicle.

Referring to the drawings, and to the embodiment of the invention which is selected for exemplification, there is shown a measuring instrument comprising a pointer or stylus 13, and an angularly adjustable platen 14, adapted for cooperation therewith. The pointer is intended to be carried by the steering knuckle, while the platen is intended to be supported by the floor, or any other flat level support parallel thereto. In general, the construction and arrangement of the instrument may be said to be such that the pointer, when swung by the steering knuckle about the axis of the king-pin, describes an arc. The platen is so placed that its plane surface will contain said arc, and the angular position of said surface is then utilized to ascertain the angularity of the axis of the king-pin.

In the present example, the pointer or stylus is provided with a clamp 15, best shown in Figs. 6 and 7, comprising two clamping plates 16, which may be drawn toward each other by a bolt 17, extending through both plates, and provided with a thumb-nut 18. Herein, a spring 19, interposed between the plates, tends to keep them separated. This clamp may be secured to a convenient part carried by a steering knuckle 20 (see Fig. 1), which is pivoted on a king-pin 21 on an axle 22. The most convenient point of attachment is the outer end of a stub axle or spindle 23, which is usually formed on or secured to the steering knuckle, and carries usual bearings (not shown) for a wheel 24. The bearings are usually held in place by a nut threaded onto the outer end of the spindle. The removal of the usual hub cap exposes the end of the spindle and the nut. If the spindle projects a sufficient distance beyond the nut, the clamp may be secured directly thereto. Otherwise, it may be clamped onto the nut (see Fig. 1).

Referring again to Fig. 7, the pointer or stylus 13 is connected to the clamp, in the present example by means providing for relative angular adjustment between these parts, as well as for vertical adjustment of the stylus. This is conveniently accomplished in this instance by the provision of two relatively telescopic parts, herein tubes 25 and 26, one of which receives the other, and the other in turn being pivotally connected to the clamp, as by providing the same with a terminal having a spherical or partially spherical surface 27, received between the plates 16, and held in its proper location, as by providing said plates with openings 28 to receive the spherical surface, as clearly illustrated in Fig. 6. Thus the clamp serves the double purpose of providing means of attachment to the spindle, and affording a convenient means of angular adjustment of the pointer. Of course, when the clamp is tightened, it serves to maintain the downwardly directed tube 26 in its proper position. The tubes 25 and 26 may be maintained in the desired relative positions, as by frictional means, herein conveniently afforded by providing the tube 25 with a longitudinal slot 29 (see Fig. 7), thus enabling the split end of the tube to be expanded or spread apart, before it is inserted into the tube 26, whereupon the tendency of the ends to spread will hold the tube in the desired position.

To permit the pointer or stylus to rise and fall in operation, it is loosely received telescopically in the tube 25, but is prevented from falling out by a pin 30, attached to the pointer and travelling in a vertically elongated slot 31, in the tube 25. To enable the user readily to see whether there is any movement of the pointer or stylus in a vertical direction with relation to the tube 25, the pointer may be, and herein is, provided with a vertical series of rings or grooves 32, rather closely spaced, and which, when viewed with reference to the lower end of the tube 25, will readily indicate the slightest movement of the pointer, which might not otherwise be noticeable.

The platen and its mounting will now be described in detail, reference being had at first to Fig. 4. The platen presents a plane surface 33, on which the pointer or stylus is adapted to rest. Angular adjustment of this surface in any desired direction is conveniently accomplished by the provision of a universally adjustable support, herein comprising a base 34, to which the platen is attached by a universal joint 35, which, in the present example, comprises a yoke block 36, carrying a pair of axially aligned gimbals or trunnions 37, and another pair of similar trunnions 38 (see Fig. 5), at right angles thereto.

These trunnions are conveniently secured to the yoke block by being threaded into the latter. The trunnions 37 are received in bearings presented by blocks 39, suitably formed on or secured to the platen 14 (see Fig. 4), while the trunnions 38 are received in bearings presented by similar blocks 40 (see Fig. 5) suitably formed on or secured to the base plate 34. Too great freedom of movement of the trunnions in their bearings may be prevented by the provision of appropriate frictional means, herein exemplified by pairs of screws 41 and 42, extending loosely through the bearing blocks 39 and 40, respectively, and threaded into yokes 43 and 44, respectively. Interposed between the yokes 43 and the adjacent bearing block 39 is a downwardly directed flange 45, presented by an angle bar 46, secured to the under side of the trunnion yoke, as by screws 47. By turning the screws 41 in the proper direction to draw the yoke 43 firmly against the flange 45, the desired frictional resistance to rocking movement is conveniently obtained. Similarly, there is interposed between the yoke 44 and the adjacent bearing block 40 a downwardly directed flange 48 of an angle bar 49, which is secured to the under side of a trunnion yoke 36 by screws 50. Thus it is evident that, by simply applying sufficient force to overcome the friction, the platen may be angularly adjusted in any desired direction, and that it will remain in the position in which it is left without danger of its moving accidentally.

Figure 3:
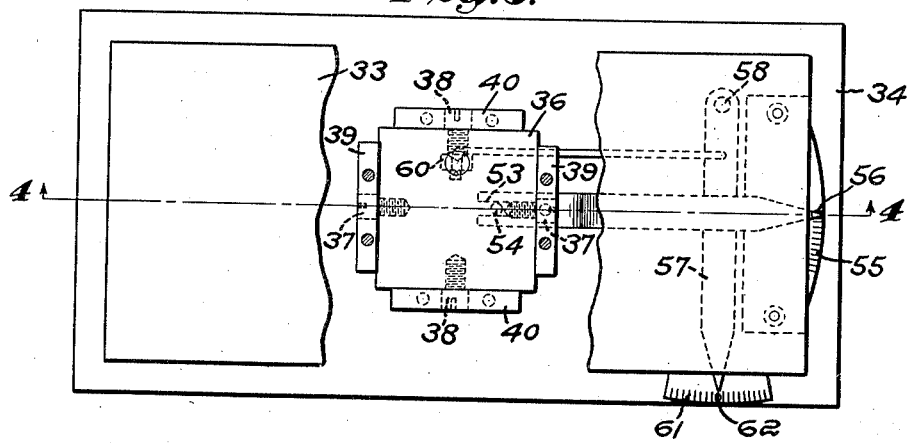
Fig. 3 is a plan on an enlarged scale, illustrating a portion of the instrument, the same comprising an angularly adjustable platen, and means for indicating its angularity.

The angular position of the platen in one direction is indicated by indicating means, herein comprising a pointer 51 (see Fig. 4), formed on a pivot 52 on the under side of one of the bearing blocks 39, said pointer presenting a slot 53, which receives a depending pin 54 carried by the trunnion yoke 36. The proportions of the parts are such that tilting of the platen about the axis of the trunnions 37 is accompanied by swinging movement of the pointer 51, and there is provided a scale 55 (see Fig. 3) secured to the under side of the platen, and calibrated in degrees from a central zero point 56. When the pointer is at zero, the shorter dimension of the platen is parallel with the space, and the floor on which the latter rests. When, however, the platen is rocked about the trunnion 37, its angular position in degrees is indicated by the reading of the scale, considered with reference to the position of the pointer.

Figure 4:
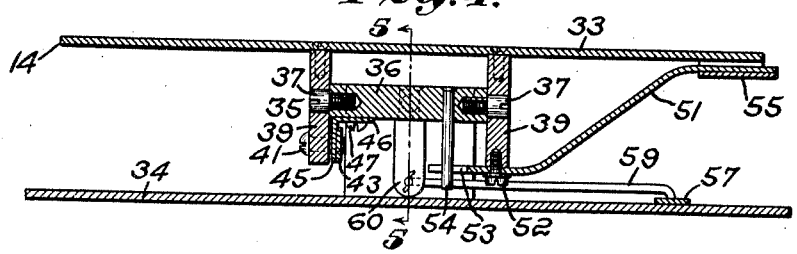
Fig. 4 is a sectional view on line 4—4 of Fig. 3.

Similar indicating means are provided for indicating the angular position of the platen, considered with reference to its longer dimension, the same herein comprising a pointer 57 (see Fig. 3), mounted on a pivot 58 on the base 34, and connected by a link 59 to a depending pin 60, best shown in Fig. 4, carried by the trunnion yoke 36. The pointer 57 cooperates with a scale 61, graduated in degrees, and having a zero point 62.

Figure 2:
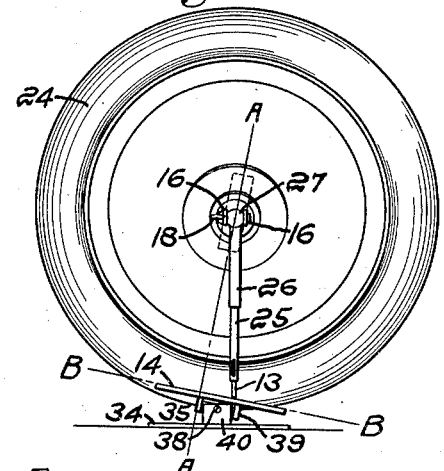
Fig. 2 is an elevation of the same, as viewed from the right-hand side of Fig. 1.

The operation of the instrument will now be described, reference being had at first to Figs. 1 and 2. Some motor vehicles have their king-pins inclined laterally, as shown in Fig. 1, while in others, the King-pin is placed with its axis exactly vertical, as viewed from the front. In all motor vehicles, however, it is important that the axis of the king-pin shall be inclined forward so that its lower end shall be in advance of its upper end, thereby to produce what is known as a "caster effect" on the front wheel, which depends upon the accuracy of this latter inclination. If it is not present, and to the right degree, there is apt to take place what is known as "shimmying" of the front wheels. Insufficient or improper forward inclination of the king-pin also effects the action of steering, when the vehicle is turning the corner. The described instrument is capable of ascertaining angularity of the king-pin in both directions. This is easily accomplished by setting up the instrument, as shown in Figs. 1 and 2. In these figures, the axis of the king-pin is designated A—A, and the plane of the upper surface of the platen designated B—B.

Referring to Fig. 1, if the platen is so adjusted that its narrower dimension, represented by the line B—B is perpendicular to the axis represented by the line A—A, and if, referring to Fig. 2, the longer dimension of the platen, represented by the line B—B is perpendicular to the axis represented by the line A—A, then when the steering knuckle is swung about the axis, the pointer or stylus 13 will naturally swing in an arc which lies in said plane, and there will be no vertical sliding movement of the pointer or stylus in the tube 25. When this condition is reached, by adjustment of the platen in both directions, until no vertical movement of the pointer takes place, the inclination of the axis of the king-pin can be read directly in degrees on the graduated scales 55 and 61. The scale 55 will show the outward or lateral inclination, and the scale 61, the forward inclination. Any variation of the platen from its correct position will instantly be evident to the operator, as swinging movement of the steering knuckle will be accompanied by vertical sliding movement of the pointer 13 with relation to its holder. When the operator notices this, he compensates for such movement by corresponding adjustment of the platen until the latter has been so adjusted that no vertical movement of the stylus occurs. He then reads the graduated scales, and compares them with known standards approved by the vehicle manufacturer.

If the axis of the king-pin is not inclined laterally, the angularly adjustable platen may be dispensed with, and in its stead the floor, or other level surface, may be used. Under these circumstances, the amplitude of vertical movement of the pointer while tracing an arc on the floor may be used as a basis for calculating the forward inclination of the axis.

Having thus described one embodiment of the invention, but without limiting myself thereto, what I claim and desire by Letters Patent to secure is:

1. Instrumentalities for measuring the angularity of the axis of the steering gear king-pin of a land vehicle with reference to a floor or other body having a plane surface, comprising in combination, a pointer, means for securing said pointer to the steering knuckle whereby said pointer may be moved with said steering knuckle in an arc about the axis of the king-pin, and means for utilizing the plane of said arc to ascertain the angular position of the axis of said king-pin with reference to said surface.

2. Instrumentalities for measuring the angularity of the axis of the steering gear king-pin of a land vehicle with reference to a floor or other body having a plane surface, comprising in combination, a pointer, means for securing said pointer to the steering knuckle whereby said pointer may be moved with said steering knuckle in an arc about the axis of the king-pin, a platen with which said pointer is adapted to contact, and means presenting an adjustable support for said platen to enable the same to be tilted angularly so as to conform with the arc described by said pointer.

3. Instrumentalities for measuring the angularity of the axis of the steering gear king-pin of a land vehicle with reference to a floor or other body having a plane surface, comprising in combination, a pointer, means for securing said pointer to the steering knuckle whereby said pointer may be moved with said steering knuckle in an arc about the axis of the king-pin, a platen with which said pointer is adapted to contact, means presenting an adjustable support for said platen to enable the same to be tilted angularly so as to conform with the arc described by said pointer, and means for indicating the angularity of said platen.

4. In an instrument for measuring the angularity of the axis of the steering gear king-pin of a land vehicle with reference to a floor or other body having a plane surface, the combination of a holder adapted to be secured to a part carried by a steering knuckle, a pointer, means connecting said pointer to said holder and providing for movement of said pointer relatively to said holder in a generally vertical direction, a platen on which said pointer is adapted to rest, and a base with respect to which said platen is angularly adjustable.

5. In an instrument for measuring the angularity of the axis of the steering gear king-pin of a land vehicle with reference to a plane surface, the combination of a holder, means for securing said holder to a part carried by a steering knuckle, a pointer, means connecting said pointer to said holder and providing for movement of said pointer relatively to said holder in a generally vertical direction, a platen on which said pointer is adapted to rest, a base with respect to which said platen is angularly adjustable, and an indicator to indicate the angular position of said platen.

6. In an instrument for measuring the angularity of the axis of the steering gear king-pin of a land vehicle with reference to a plane surface, the combination of a holder, means for securing said holder to a part carried by a steering knuckle, a pointer, means connecting said pointer to said holder and providing for movement of said pointer relatively to said holder in a generally vertical direction, a platen on which said pointer is adapted to rest, a base with respect to which said platen is angularly adjustable, and indicator means to indicate the angular position of said platen in two directions one transverse to the other.

7. In an instrument for measuring the angularity of the axis of the steering gear king-pin of a land vehicle with reference to a plane surface, the combination of a holder, means for securing said holder to a part carried by a steering knuckle, a pointer, means presenting a telescopic joint between said pointer and said holder providing for movement of said pointer relatively to said holder in a generally vertical direction, a platen on which said pointer is adapted to rest, and a base with relation to which said platen is angularly adjustable.

8. In an instrument for measuring the angularity of the axis of the steering gear king-pin of a land vehicle with reference to a plane surface, the combination of a holder, means for securing said holder to a part carried by a steering knuckle, a pointer, means presenting a telescopic joint between said pointer and said holder providing for movement of said pointer relatively to said holder in a generally vertical direction, indicating means carried by said pointer to indicate vertical movement with relation to said holder, a platen on which said pointer is adapted to rest, and a base with relation to which said platen is angularly adjustable.

9. Instrumentalities for measuring the angularity of the axis of the steering gear king-pin of a land vehicle with reference to a plane surface, comprising, in combination, a pointer, means for securing said pointer to the steering knuckle whereby said pointer may be moved with said steering knuckle in an arc about the axis of the king-pin, means presenting a plane surface, and means providing for adjustment of said surface to correspond with the path traced by said pointer.

10. Instrumentalities for measuring the angularity of the axis of the steering gear king-pin of a land vehicle with reference to a plane surface, comprising, in combination, a pointer, means for securing said pointer to the steering knuckle whereby said pointer may be moved with said steering knuckle in an arc about the axis of the king-pin, a platen, and an angularly adjustable support for said platen, whereby said platen can be tilted angularly with reference to a floor or other body having a plane surface.

11. The method of measuring the angularity of the axis of a steering gear king-pin of a land vehicle with reference to a plane surface characterized by swinging the steering knuckle about the axis of the king-pin thereby to cause a part carried by the steering knuckle to trace an arc, and utilizing the angular position of the plane of said arc to ascertain the angularity of the axis of said king-pin with reference to a floor or other body having a plane surface.

12. In an instrument for measuring the angularity of the axis of the steering gear king-pin of a land vehicle with reference to a plane surface, the combination of a holder, means for securing said holder to a part carried by the steering knuckle, a pointer, and means connecting said pointer to said holder and providing for movement of said pointer relatively to said holder in a generally vertical direction.

13. In an instrument for measuring the angularity of the axis of the steering gear king-pin of a land vehicle with reference to a plane surface, the combination of a clamp adapted to be clamped onto a part carried by the steering knuckle, a holder carried by said clamp, a pointer, and means connecting said pointer to said holder and providing for movement of said pointer relatively to said holder in a generally vertical direction.

14. In an instrument for measuring the angularity of the axis of the steering gear king-pin of a land vehicle with reference to a plane surface, the combination of a clamp adapted to be clamped onto a part carried by said steering knuckle, a holder carried by and angularly adjustable relatively to said clamp, a pointer, and means connecting said pointer to said holder and providing for movement of said pointer relatively to said holder in a generally vertical direction.

15. In an instrument for measuring the angularity of the axis of the steering gear king-pin of a land vehicle with reference to a plane surface, the combination of a clamp adapted to be clamped onto a part carried by said steering knuckle, a holder clamped by and angularly adjustable relatively to said clamp, a pointer, and means connecting said pointer to said holder and providing for movement of said pointer relatively to said holder in a generally vertical direction.

16. In an instrument for measuring the angularity of the axis of the steering gear king-pin of a land vehicle with reference to a plane surface, the combination of a holder, means for securing said holder to a part carried by the steering knuckle, a pointer, and means telescopically connecting said pointer with said holder and providing for movement of said pointer relatively to said holder in a generally vertical direction.

17. In an instrument for measuring the angularity of the axis of the steering gear king-pin of a land vehicle with reference to a plane surface, the combination of a pointer, and means for securing said pointer to the steering knuckle to cause said pointer to trace an arc whose plane is angularly disposed with relation to such surface.

In testimony whereof, I have signed my name to this specification.

JOHN F. DUBY.